US008001357B2

(12) United States Patent
Abzarian et al.

(10) Patent No.: US 8,001,357 B2
(45) Date of Patent: Aug. 16, 2011

(54) PROVIDING A SINGLE DRIVE LETTER USER EXPERIENCE AND REGIONAL BASED ACCESS CONTROL WITH RESPECT TO A STORAGE DEVICE

(75) Inventors: David Abzarian, Kirkland, WA (US); Todd L Carpenter, Monroe, WA (US); Harish S Kulkarni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/113,199

(22) Filed: Apr. 30, 2008

(65) Prior Publication Data
US 2009/0276595 A1 Nov. 5, 2009

(51) Int. Cl.
*G06F 12/00* (2006.01)
(52) U.S. Cl. .......... 711/173; 711/163; 711/E12.001
(58) Field of Classification Search .......... 711/173, 711/114, 112, 156, 170, 12.001 E
See application file for complete search history.

(56) References Cited

U.S. PATENT DOCUMENTS

| 5,754,821 | A | 5/1998 | Cripe et al. | |
|---|---|---|---|---|
| 6,711,591 | B1 * | 3/2004 | Rafanello et al. | 711/111 |
| 6,745,286 | B2 * | 6/2004 | Staub et al. | 711/114 |
| 7,124,301 | B1 | 10/2006 | Uchida | |
| 7,203,808 | B2 | 4/2007 | Rothman et al. | |
| 2003/0177379 | A1 | 9/2003 | Hori et al. | |
| 2005/0144405 | A1 | 6/2005 | Doran et al. | |
| 2005/0216685 | A1 | 9/2005 | Heden et al. | |
| 2006/0136690 | A1 | 6/2006 | Hsieh | |
| 2006/0143417 | A1 | 6/2006 | Poisner et al. | |
| 2006/0200629 | A1 | 9/2006 | Oishi et al. | |
| 2007/0143555 | A1 | 6/2007 | Nemiroff et al. | |
| 2007/0174897 | A1 | 7/2007 | Rothman et al. | |
| 2007/0180210 | A1 | 8/2007 | Thibadeau | |
| 2009/0234978 | A1 * | 9/2009 | Uno | 710/14 |

OTHER PUBLICATIONS

Heikkila, "Encryption: Security Considerations for Portable Media Devices," IEEE Security and Privacy, vol. 5, No. 4, IEEE Computer Society, IEEE, 2007, pp. 22-27.
Scarfone, et al., "Guide to Storage Encryption Technologies for End User Devices", Recommendations of the National Institute of Standards and Technology, Nov. 2007, pp. 40.
"TrueCrypt", 2003-2008, TrueCrypt Foundation, pp. 2.
"FreeOTFE", retrieved at <<http://www.freeotfe.org/docs/description.htm>>, earliest known publication Dec. 17, 2007.

* cited by examiner

*Primary Examiner* — Pierre-Michel Bataille
(74) *Attorney, Agent, or Firm* — Capitol City TechLaw; Richard C. Irving (57) ABSTRACT

A method and a storage device may be provided. The storage device may include physical storage subdivided into a number of regions. The regions may start and end based on logical block addresses specified in a region table. At least one of the regions may be mapped to a logical drive letter. One or more others of the regions may be mapped to a subfolder with respect to the logical drive letter. The storage device may include an access control table. Each entry of the access control table may correspond to a respective region of the physical storage. Each of the entries of the access control table may indicate whether the respective region is protected and whether at least one entity is permitted protected access to the respective region after being successfully authenticated.

20 Claims, 6 Drawing Sheets

| LBA START | LBA END | PROTECTION | ACCESS CONTROL |
|---|---|---|---|
| 0 | 99 | WRITE PROTECTED | USER1 |
| 100 | 199 | NONE | N/A |
| 200 | 399 | ENCRYPTED | USER1; USER2 |
| 400 | 649 | ENCRYPTED | USER3 |
| 650 | N | ENCRYPTED | USER2 |

PROVIDING A SINGLE DRIVE LETTER USER EXPERIENCE AND REGIONAL BASED ACCESS CONTROL WITH RESPECT TO A STORAGE DEVICE

BACKGROUND

Data stored on portable storage devices, such as, for example, Universal Serial Bus (USB) flash drives, or other portable storage devices, are inherently unprotected. If such a portable storage device becomes lost or stolen, the data stored thereon may be accessible by others.

One proposed solution for protecting data stored on a portable storage device, or other storage device, includes software-based encryption and access control. The proposed solution includes platform-specific software for a processing device, which limits portability of the portable storage device only to processing devices executing the platform-specific software. Further, software-based encryption, generally, is weaker than hardware-based encryption. Thus, security is degraded because the software-based encryption is incapable of protecting the data from an offline brute force decryption attack.

Existing hardware solutions for protecting data stored on a storage device are unable to provide simultaneous access to data having differing protection levels. Attempts to provide multiple protected storage areas in a storage device have had mixed success. For example, multiple protected storage areas in a single storage device may be mapped as multiple logical drives when using some operating systems, such as, for example, a Windows® based operating system (available from Microsoft Corporation of Redmond, Wash.) in a processing device to which the portable storage device is connected, resulting in an undesirable user experience.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a storage device may be provided having a physical storage medium with a number of accessible regions or partitions. Each of the accessible regions or partitions may correspond to an entry of a region table or a partition table, respectively. When the storage device is to be used with a processing device executing, for example, a Windows® based operating system (available from Microsoft Corporation of Redmond, Wash.), each of the entries of the region table or the partition table may include a starting logical block address, an ending logical block address or a length of a respective region or partition, and an indication with respect to whether a logical drive letter is to be assigned to the respective region or partition or suppressed from being assigned to the respective region or partition. Regions or partitions, which are suppressed from being assigned a logical drive letter, may be mapped to a subfolder under the logical drive letter assigned to another region or partition.

The storage device may include an access control system for controlling access to protected regions or partitions. The access control system may include an access control table having a number of access control entries, each of which may correspond to a respective partition of the physical storage of the storage device, or any LBA-based region regardless of partition boundaries. Each of the entries of the access control table may include one of a number of protection levels, or an indication of no protection. One of the entries of the access control table, including one of the number of protection levels, may further include one or more entity identifiers corresponding to one or more entities that are permitted protected access to respective regions or partitions. The protection levels may include one or more of read/write protection without encryption, write protection without encryption, read/write protection with encryption, read protection with encryption, and read protection without write protection, as well as other or different protection levels.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a storage device are provided in which a physical storage medium may have a number of partitions or LBA-based regions. Hereinafter, the terms "region" or "regions" will be used to refer to a partition or partitions, or an LBA-based region or LBA-based regions. The regions may be defined based on logical block addresses (LBAs) of the physical storage medium. When the storage device is connected to a processing device, executing an operating system, such as, a Windows® based operating system, available from Microsoft Corporation of Redmond Washington, or another operating system, one of the regions may be assigned a logical drive letter, such that the one of the regions may be mapped to the logical drive letter. Thus, for example, if a logical drive letter "M" is assigned to the one of the regions, then the one of the regions may be accessed by using a reference, such as, "M:\". Others of the regions may suppress respective logical drive letter assignments, such that, the others of the regions may be mapped to respective subfolders of the logical drive letter assigned to the one of the regions. With respect to the example discussed above, one of the others of the regions may be accessed by using a reference, such as, for example, "M:\Protected1", with respect to a region named "Protected1". The above may be implemented, when the storage device is connected to a processing device executing a Windows® based operating system, by using reparse points. A reparse point is a type of file system object, found in Windows® based operating systems, which may be used to extend a file system by adding additional information to a directory entry. A file system filter may interpret how the operating system will treat the additional information.

The storage device may include an access control system for controlling access to respective regions, such that only particular entities may be permitted to access particular regions. Further, some or all of the regions may have an assigned protection level. In some embodiments consistent with the subject matter of this disclosure, protection levels may include one or more of: read/write protection without encryption; write protection without encryption; read/write protection with encryption; read protection with encryption; and read protection without write protection. In other embodiments, other levels of protection may be included.

Exemplary Operating Environment

Figure 1:
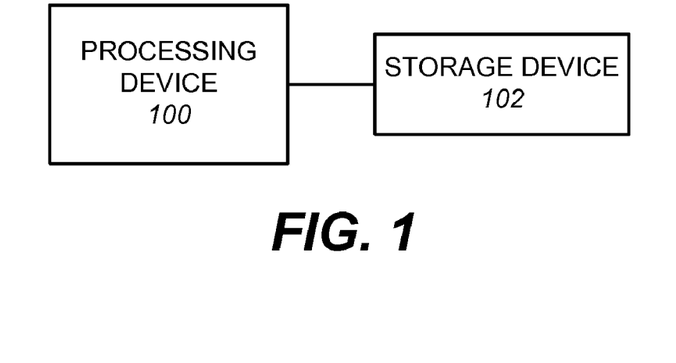
FIG. 1 illustrates an exemplary operating environment for embodiments consistent with subject matter of this disclosure.

FIG. 1 is a block diagram illustrating an exemplary operating environment for embodiments consistent with the subject matter of this disclosure. The exemplary operating environment may include a processing device 100 with a storage device 102 connected thereto. In some embodiments, storage device 102 may be a Universal Serial Bus (USB) flash RAM device, or another type of storage device.

Exemplary Processing Device

Figure 2:
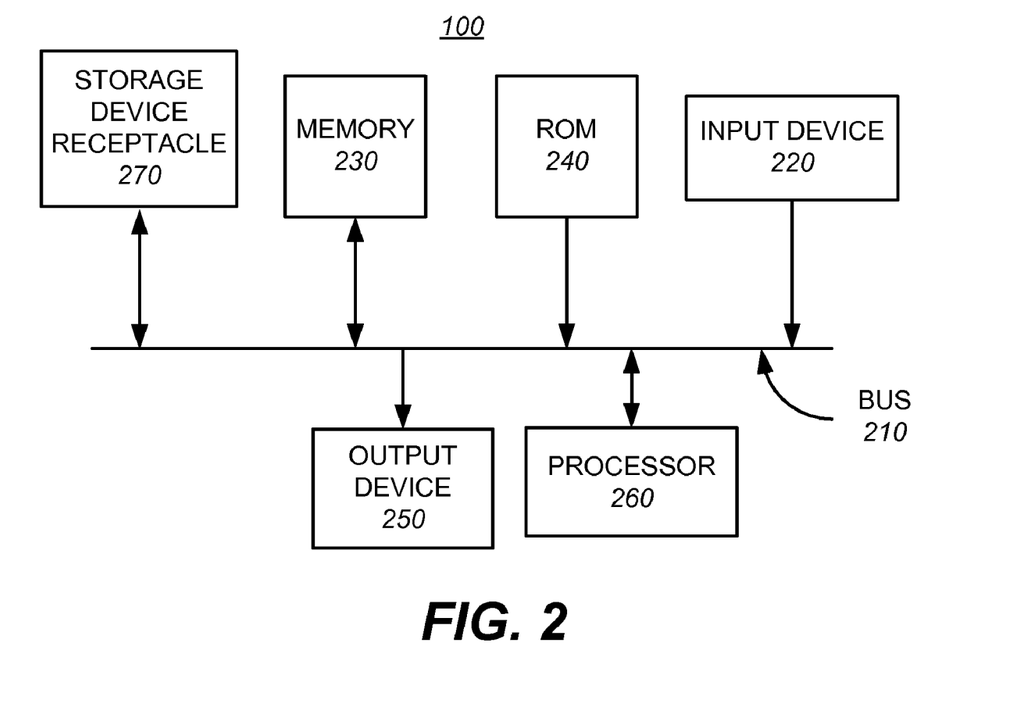
FIG. 2 is a functional block diagram of an exemplary processing device which may be used with embodiments of a storage device consistent with the subject matter of this disclosure

FIG. 2 is a functional block diagram of an exemplary processing device 100, which may be used in the exemplary operating environment of FIG. 1. Processing device 100 may be a desktop personal computer (PC), a laptop PC, a handheld processing device, or other processing device. Processing device 100 may include a bus 210, an input device 220, a memory 230, a read only memory (ROM) 240, an output device 250, a processor 260, and a storage device receptacle 270. Bus 210 may permit communication among components of processing device 100.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device receptacle 270 may include a USB port or other mechanism for connecting storage device 102 to processing device 100. In some embodiments, processing device 100 may have multiple storage device receptacles 270.

Input device 220 may include a keyboard, a pointing device, or other input device. Output device 250 may include one or more conventional mechanisms that output information, including one or more display monitors, or other output devices.

Processing device 100 may perform functions in response to processor 260 executing sequences of instructions contained in a tangible machine-readable medium, such as, for example, memory 230, ROM 240, a storage device or other media. Such instructions may be read into memory 230 from another machine-readable medium or from a separate device via a communication interface (not shown).

Storage Device

Figure 3:
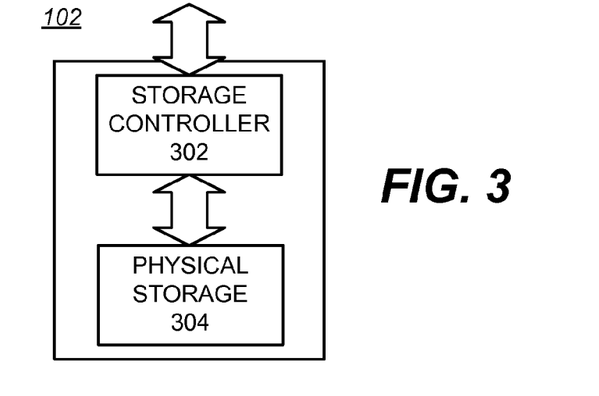
FIG. 3 illustrates an embodiment of a storage device consistent with the subject matter of this disclosure.

FIG. 3 is a functional block diagram illustrating a more detailed view of storage device 102 in one embodiment consistent with the subject matter of this disclosure. Storage device 102 may include a storage controller 302 and a physical storage 304.

Storage controller 302 may receive commands for accessing physical storage 304, may provide data to write to physical storage 304, and may provide read data from physical storage 304.

Physical storage 304 may include a transient storage medium capable of being electronically read from and electronically written to, such as a flash RAM or other transient storage medium.

Figure 4:
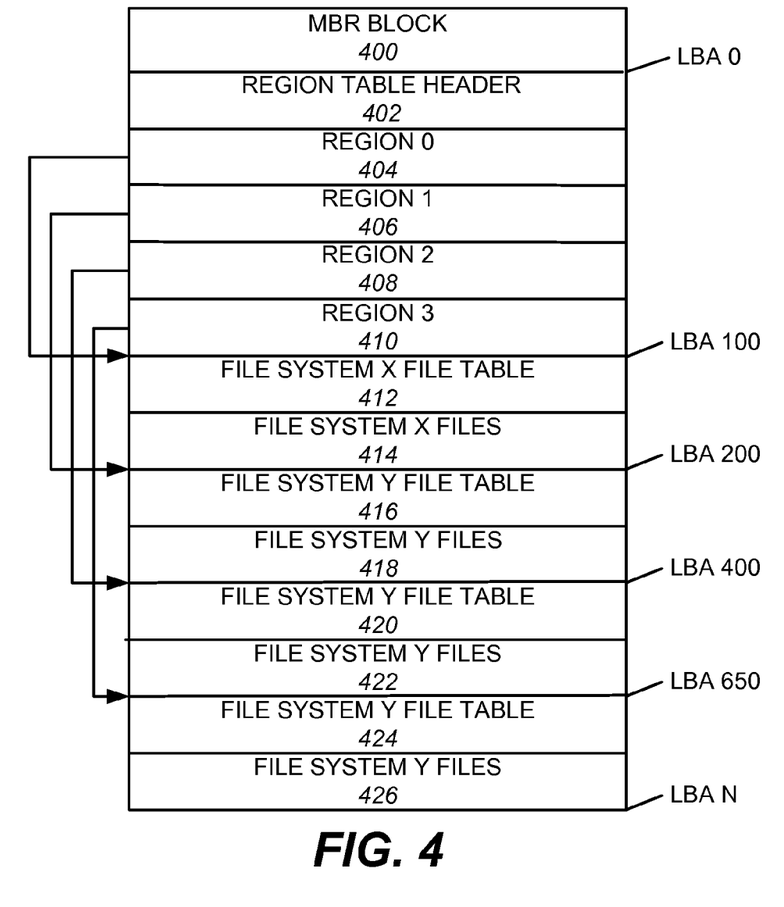
FIG. 4 illustrates an exemplary layout of physical storage of a storage device.

FIG. 4 illustrates an exemplary physical storage layout for subdividing a physical storage of portable storage device 102 into a number of portions, or regions, based on logical block address ranges. According to the exemplary physical storage layout, a first block may be a boot controller, referred to as a master boot record (MBR) 400. A region table header 402 may be stored, beginning at LBA 0. Region table header 402 may include information about a corresponding region table, such as, for example, a total number of regions and/or other information. Region table header 402 may be followed by a number of entries, each of which may provide information with respect to a respective region. In FIG. 4, region table header 402 is followed by an entry describing region 0 404, an entry describing region 1 406, an entry describing region 2 408, and an entry describing region 3 410. Although FIG. 4 shows a region table having four entries with respect to four respective regions, a region table may have fewer or more entries.

Following the regions may be a file system file table and file system files corresponding to each of the regions. For example, a file system X file table 412 and file system X files 414 may correspond to the entry describing region 0 404, a file system Y file table 416 and file system Y files 418 may correspond to the entry describing region 1 406, a file system Y file table 420 and file system Y files 422 may correspond to the entry describing region 2 408, and a file system Y file table 424 and file system Y files 426 may correspond to the entry describing region 3 410. Further, region 0 404 may point to a LBA of a beginning of file system X file table 412, the entry describing region 1 406 may point to a LBA of a beginning of file system Y file table 416, the entry describing region 2 408 may point to a LBA of a beginning of file system Y file table

420, and the entry describing region 3 410 may point to a LBA of a beginning of file system Y file table 424. According to the exemplary physical storage layout of FIG. 4, file system X file table 412 begins at LBA 100, file system Y file table 416 begins at LBA 200, file system Y file table 420 begins at LBA 400, file system Y file table 424 begins at LBA 650, and file system Y files 426 ends at LBA N.

In an embodiment consistent with the subject matter of this disclosure, each entry of a region table may include information with respect to a starting LBA and an ending LBA (or a size) of a respective region of physical storage 304.

In some embodiments, some entries of a region table may include a suppression identifier. Entries of the region table, which do not include the suppression identifier, may have a respective region mapped to a respective logical drive letter by a processing device connected to a storage device including the region table. Entries of the region table, which include the suppression identifier, may suppress a logical drive letter assignment by the processing device connected to the storage device. In some embodiments, one region of the region table may not include a suppression identifier, while other regions of the region table may include the suppression identifier. Thus, the one region may be mapped to a logical drive letter and the other regions may be mapped to a subfolder with respect to the logical drive letter.

Figure 5:
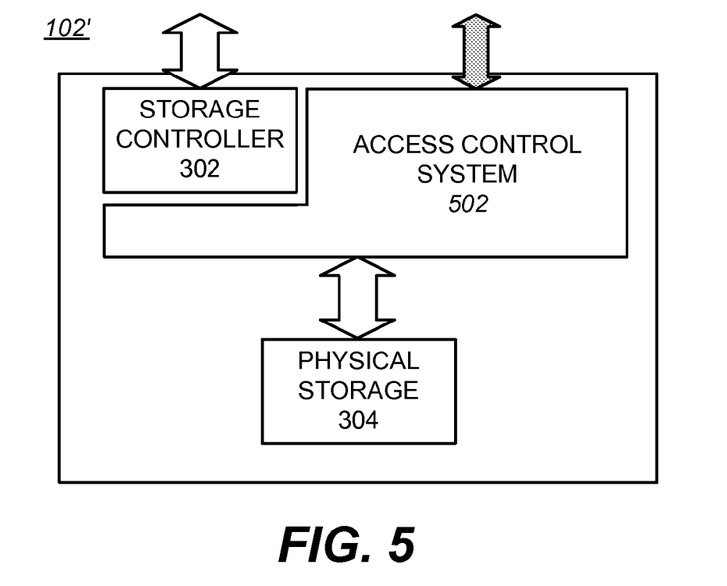
FIG. 5 illustrates a second embodiment of a storage device consistent with the subject matter of this disclosure.

FIG. 5 is a functional block diagram illustrating storage device 102', in a second embodiment consistent with the subject matter of this disclosure. Storage device 102' may include storage controller 302, access control system 502, and physical storage 304.

Storage controller 302 may receive commands for accessing physical storage 304, may provide data to write to physical disk storage 304, and may provide data read from physical storage 304.

Access control system 502 may include an access control mechanism for restricting protected access to protected regions, such that only particular authenticated entities may be granted protected access to the protected regions. A protected region may be a region with protected access, such as read/write protection, write protection, and read protection without write protection, as well as other or different types of protected access. A processing device, such as, for example, processing device 100, may have an authentication dialog with access control system 502 via out-of-band signaling. The out-of-band signaling may conform to the IEEE-1667 standard, another standard, or no standard.

Physical storage 304 may be accessed through storage controller 302 and access control system 502. In this embodiment, the regions of physical storage 304 may have no protection or a protection level of read/write protection, write protection, read protection without write protection, or another protection level.

Figure 6:
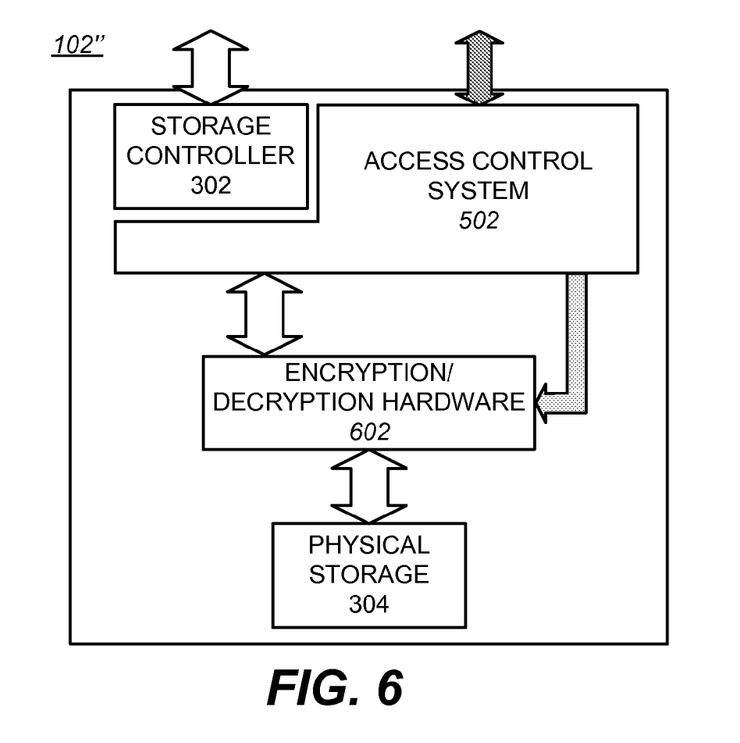
FIG. 6 illustrates a third embodiment of a storage device consistent with the subject matter of this disclosure.

FIG. 6 is a functional block diagram illustrating storage device 102", in a third embodiment consistent with the subject matter of this disclosure. Portable storage device 102" may include storage controller 302, access control system 502, encryption/decryption hardware 602 and physical storage 304.

Storage controller 302 may receive commands for accessing physical storage 304, may provide data to write to physical disk storage 304, and may provide data read from physical storage 304.

Access control system 502 may restrict access to protected regions, such that only particular authenticated entities may be granted protected access to the protected regions. A processing device, such as, for example, processing device 100, may have an authentication dialog with access control system 502 via out-of-band signaling, such as, for example, out-of-band signaling conforming to the IEEE-1667 standard, another standard, or no standard. Further, an encryption key and/or a decryption key, such as, for example, a Public Key Infrastructure (PKI) key, a symmetric key, or other key, may be provided to encryption/decryption hardware 602 by access control system 502. In some embodiments, encryption and decryption may be performed by storage device 102", such that, encryption and decryption may be transparent with respect to a processing device to which storage device 102" is connected. For example, when the processing device accesses an encrypted region of physical storage 304, encryption and/or decryption may be performed by encryption/decryption hardware 602 with the processing device being completely unaware that encryption and/or decryption is being performed. In other words, the encrypted region may appear to the processing device as a region having unencrypted data.

Physical storage 304 may be accessed through encryption/decryption hardware 602, access control system 502, and storage controller 302. In this embodiment, the regions of physical storage 304 may have no protection or a protection level of read/write protection without encryption, write protection without encryption, read protection with encryption, and read protection without write protection, or other protection levels.

The functional block diagrams of FIGS. 3, 5, and 6 are only exemplary. Each functional block of FIGS. 3, 5, and 6 may reside in separate physical components, or may be combined. For example, storage controller 302 may be combined with access control system 502, while encryption/decryption hardware 602 may reside in a separate component, or access control system 502 may be combined with encryption/decryption hardware 602, while storage controller 302 resides in a separate component. In other embodiment consistent with the subject matter of this disclosure, ones of the functional blocks of FIGS. 3, 5, and 6 may reside in a respective single component, or may be combined into one or more components in a number of different ways.

Figure 7:
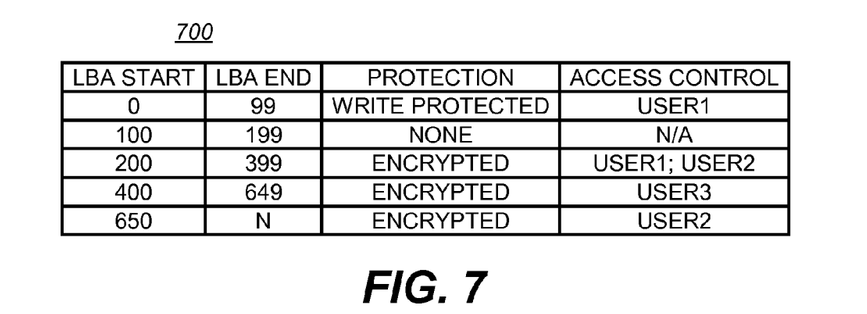
FIG. 7 shows an exemplary access control table, which may be included in an access control system of a storage device consistent with the subject matter of this disclosure.

FIG. 7 illustrates an exemplary access control table 700 which may be included in access control system 502 in embodiments consistent with the subject matter of this disclosure. Access control table 700 may include, with respect to each region, a starting LBA, an ending LBA, a protection level, and one or more entities when access to a region is restricted. Alternatively, access control table 700 may include, with respect to each of the regions, an offset or length instead of an ending LBA. According to access control table 700, a physical storage of a portable storage device includes five regions. A first region starts at LBA 0 and ends at LBA 99, a second region starts at LBA 100 and ends at LBA 199, a third region starts at LBA 200 and ends at LBA 399, a fourth region starts at LBA 400 and ends at LBA 649, and a fifth region starts at LBA 650 and ends at LBA N.

The first region may be write protected and restricted to an entity called, user1. Thus, only entity user1 may access the first region to write data to the first region after appropriate authentication. All protected access to regions may be granted to an entity only after the entity is authenticated.

The second region may have no protection and no access control. Thus, any entity may access the second region for reading and/or writing.

The third region may be encrypted and may be accessed only by entities user1 and user2. Thus, only entities user1 and user2 may be provided with encrypted write access to the third region and decrypted read access from the third region after appropriate authentication. Other entities may not be permitted access to the third region.

The fourth region is encrypted and may be accessed only by entity user3 after appropriate authentication. Thus, only entity user3 may be provided with encrypted write access to the fourth region and decrypted read access from the fourth region after successful authentication. Other entities may not be permitted access to the fourth region.

The fifth region is encrypted and may be accessed only by entity user2 after appropriate authentication. Thus, only entity user2 may be provided with encrypted write access to the fifth region and decrypted read access from the fifth region after successful authentication. Other entities may not be permitted access to the fifth region.

It should be noted that in various embodiments, entities may include users, applications, computers or devices, or any uniquely identifiable entity that is supported by the access control system.

Exemplary Processing

Figure 8:
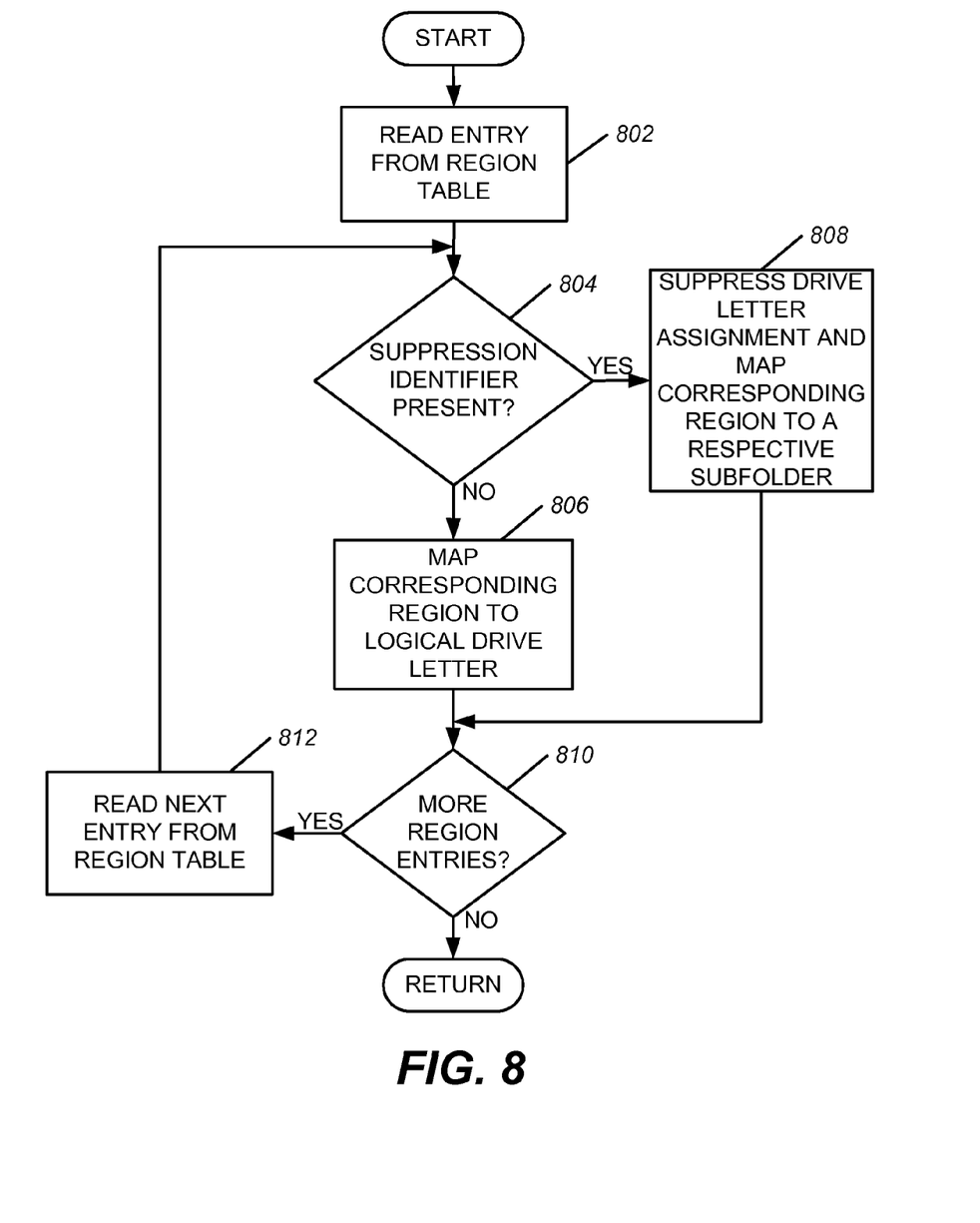
FIG. 8 is a flowchart illustrating an exemplary process for mapping some regions of physical storage of a portable storage device to a logical drive letter and for mapping other regions of physical storage to a respective subfolder associated with the logical drive letter.

FIG. 8 is a flowchart illustrating an exemplary process for a processing device, such as, for example, processing device 100, connected to a storage device including physical storage, such as, for example, storage device 102, 102', or 120". The physical storage, in some embodiments, may include files stored according to New Technology File System (NTFS), which is publicly available from Microsoft Corporation of Redmond, Wash., or according to another file system.

The process may subdivide the physical storage of the portable storage device into a number of regions based on logical block address (LBA) ranges. The process may begin with the processing device reading an entry from a region table stored on the physical storage of the storage device (act 802). The processing device may then determine whether a suppression identifier is present in the entry for the region table (act 804). If the suppression identifier is not present in the entry from the region table, then the processing device may map a corresponding region of the physical storage, as defined by the entry in the region table, to a logical drive letter by assigning the logical drive letter to the corresponding region (act 806). The corresponding region may be referred to as a mount volume.

If, during act 804, the processing device determines that the suppression identifier is present in the entry from the region table, then the processing device may suppress a logical drive letter assignment with respect to the corresponding region, resulting in the corresponding region being mapped to a respective subfolder under the logical drive letter assigned to the mount volume (act 808). In some embodiments, the subfolder may be named based on a name of the corresponding region. As previously mentioned, the above may be implemented, when the storage device is connected to a processing device executing a Windows® based operating system, by using reparse points.

After performing either act 806 or act 808, the processing device may access the region table to determine whether there are more entries in the region table (act 810). If there are more entries, the processing device may read a next entry from the region table (act 812) and may again perform acts 804, 806, and 810, or acts 804, 808, and 810.

The above exemplary process may assign a logical drive letter to a region when a suppression identifier is not present in a corresponding entry of a region table and may suppress assignment of a logical drive letter to a corresponding region when the suppression identifier is present in the corresponding entry of the region table. In an alternate embodiment, a logical drive letter may be assigned to a region when a corresponding entry of a region table includes an identifier and assignment of a logical drive letter to a region may be suppressed when a corresponding entry of the region table does not include the identifier.

Figure 9:
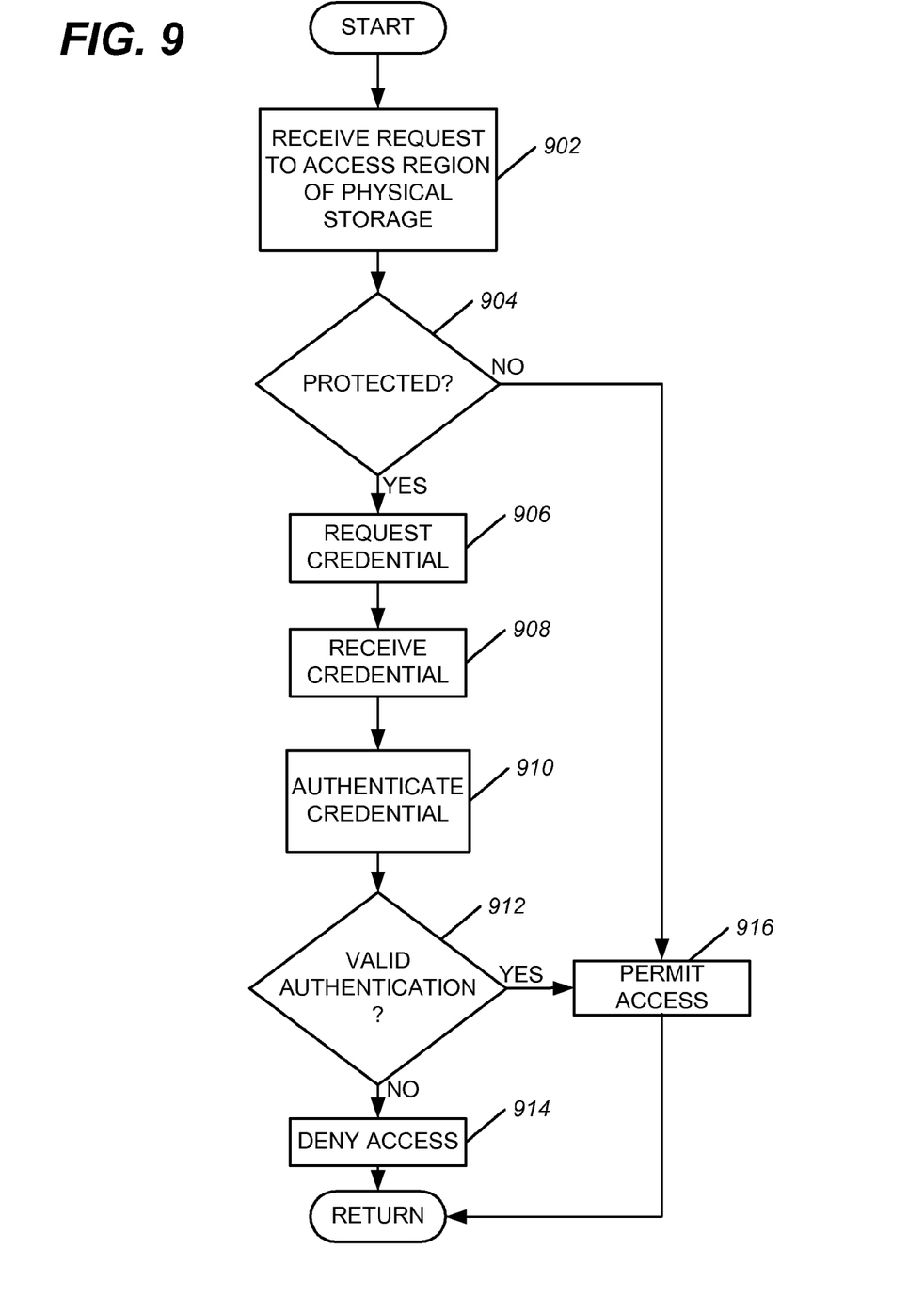
FIG. 9 is a flowchart illustrating an exemplary process for an access control system of a portable storage device consistent with the subject matter of this disclosure.

FIG. 9 is a flowchart of an exemplary process which may be performed by a storage device, such as, for example, storage device 102' or 102", which includes access control system 502. The process may begin with storage controller 302 receiving a request to access a region of physical storage 304 (act 902). Storage controller 302 may then inform access control system 502 to access an entry of an access control table, corresponding to the region, to determine whether the region is protected with respect to the requested access (act 904). For example, if the requested access includes a write to the region and the region is write protected, then the region is protected with respect to the requested access. If the region is determined to be not protected with respect to the requested access, then access control system 502 may permit access to the region (act 916).

If, during act 904, access control system 502 determines that the region is protected with respect to the requested access, then access control system 502 may request a credential from a processing device connected to the portable storage device (act 906). In some embodiments, the request for the credential may be communicated to the processing device from access control system 502 via out-of-band signaling.

Access control system 502 may then receive the credential from the processing device (act 908). In some embodiments, the credential may be received via out-of-band signaling. The credential may be a user ID and a password, an entity ID and a password, a PKI-based certificate, a symmetric key, or another type of credential. Access control system 502 may then attempt to authenticate the received credential via an authentication mechanism (act 910). The authentication mechanism may determine that a received credential is a valid credential from an entity that is permitted protected access to the region, as indicated by the entry of the access control list corresponding to the region.

Access control system 502 may then determine whether the received credential was authenticated as being valid and from an entity that is permitted protected access to the region (act 912). If access control system 502 determines that the received credential has been authenticated as valid and is from an entity that is permitted protected access to the region, then access control system 502 may permit the requested access (act 916). Otherwise, the requested access to the region may be denied (act 914).

The exemplary process described by the flowchart of FIG. 9 is only exemplary. In an alternate embodiment, a request from a processing device for access to a region of physical storage of a storage device may include a credential, such that acts 906 and 908 for requesting and receiving the credential may be omitted. In a second alternate embodiment, a credential may be provided to the storage device via out-of-band signaling, without the storage device first providing a request for the credential to the processing device.

Configuration Interfaces

Embodiments consistent with the subject matter of this disclosure may include configuration interfaces for creating, modifying, deleting, and enumerating protected regions and for adding, deleting, associating and configuring entities for enumeration and authentication with respect to protected regions. In some embodiments, out-of-band signaling may be used to communicate with the access control mechanism to configure regions and to configure the entities for enumeration and authentication.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 8 and 9, or may implement acts in a different order than as shown. Accordingly, the appended claims and their legal equivalents define the invention, rather than any specific examples given.

We claim as our invention:

1. A machine-implemented method for accessing a storage device having a plurality of regions, the machine-implemented method comprising:
    mapping a region of the plurality of regions to a logical drive letter; and
    mapping others of the plurality of regions to respective subfolders under the logical drive letter, the storage device including a region table having information with respect to each of the plurality of regions, entries of the region table, corresponding to the others of the plurality of regions, indicating that a drive letter assignment is to be suppressed for a respective entry by either a presence of an identifier or an absence of the identifier.

2. The machine-implemented method of claim 1, further comprises:
    subdividing storage of the storage device into the plurality of regions based on logical block address ranges, each of the plurality of regions being unprotected or being protected according to one of a plurality of types of protection.

3. The machine-implemented method of claim 1, wherein:
    each of the plurality of regions is either unprotected or has a respective one of a plurality of types of protection, the plurality of types of protection comprising:
    read/write protection without encryption, write protection without encryption, read/write protection with encryption and read protection with encryption.

4. The machine-implemented method of claim 1, further comprises:
    subdividing storage of the storage device into the plurality of regions based on logical block address ranges, each of the plurality of regions having no protection or a respective one of a plurality of types of protection, the plurality of types of protection comprising:
    read/write protection without encryption, write protection without encryption, read/write protection with encryption, and read protection with encryption.

5. The machine-implemented method of claim 1, further comprising:
    authenticating access to one of the plurality of regions based on an access control list entry associated with the one of the plurality of regions.

6. The machine-implemented method of claim 1, further comprising:
    subdividing storage of the storage device into the plurality of regions based on logical block address ranges, each of the plurality of regions having no protection or a respective one of a plurality of types of protection;
    authenticating access to one of the plurality of regions, having a respective one of the plurality of types of protection, the authenticating being based on an access control list entry associated with the one of the plurality of regions; and
    permitting access to the one of the plurality of regions, after performing the authenticating, only when the authenticating is successfully performed.

7. The machine-implemented method of claim 1, further comprising:
    authenticating an entity before permitting the entity to access a protected one of the plurality of regions, the authenticating further comprising:
        permitting access by the entity to the protected one of the plurality of regions only when the entity corresponds to an entity identifier being permitted access to the protected one of the plurality of regions and a provided credential is successfully authenticated.

8. A storage device comprising:
    a storage controller to permit a processing device to access physical storage;
    an access control mechanism to authenticate an entity before permitting access to a protected portion of the physical storage; and
    the physical storage having stored thereon a region table having a plurality of entries, each of the plurality of entries defining a respective region based on logical block addresses, some of the plurality of entries indicating, by either a presence of an identifier or an absence of the identifier, that an assignment of a respective logical drive letter to the respective region is to be suppressed.

9. The storage device of claim 8, wherein:
    one of the plurality of entries indicating that an assignment of a respective logical drive letter to the respective region is to be performed, and
    a plurality of regions, corresponding to the some of the plurality of entries of the region table, to be addressable as subfolders with respect to the logical drive letter.

10. The storage device of claim 8, further comprising:
    encryption/decryption hardware for producing encrypted data before storing the encrypted data onto the physical storage and for producing decrypted data from the stored encrypted data on the physical storage, the producing of the encrypted data or the producing of the decrypted data being transparent with respect to the processing device and being performed only after the access control mechanism successfully authenticates the entity.

11. The storage device of claim 8, wherein:
    the access control mechanism accesses an access control table when the storage device receives a request to access a region of the physical storage, and
    the access control table has a plurality of entries, each of the plurality of entries of the access control table corresponds to a respective region of the physical storage and includes a range of the respective region, and an indication of either no protection level or one of a plurality of protection levels.

12. The storage device of claim 8, wherein:
    the access control mechanism accesses an access control table when the storage device receives a request to access a region of the physical storage, the access control table has a plurality of entries, each of the plurality of entries of the access control table corresponds to a respective region of the physical storage and includes a range of the respective region and an indication of either no protection level or one of a plurality of protection levels, and the plurality of protection levels include read/write protection without encryption, and write protection without encryption.

13. The storage device of claim 8, wherein the access control mechanism is configurable via out-of-band signaling.

14. A storage device comprising:

a region table defining a plurality of regions for storage, each entry of the region table corresponding to a respective one of the plurality of regions, an entry of the region table indicating that a first drive letter assignment is to be made by a processing device with respect to the entry of the region table, each one of other entries of the region table indicating, by either a presence of an identifier or an absence of the identifier, that a next drive letter assignment for the respective region is to be suppressed and the respective region is to be mapped to a respective subfolder under a drive letter assigned by the first drive letter assignment.

15. The storage device of claim 14, further comprising:

an access control table having a plurality of entries, each of the plurality of entries of the access control table corresponding to a respective one of the plurality of regions, at least some of the plurality of entries of the access control table including at least one entity identifier and one of a plurality of protection levels, only entities corresponding to one of the at least one entity identifier being permitted access to the respective one of the plurality of regions according to the one of the plurality of protection levels.

16. The storage device of claim 14, further comprising:

an access control table having a plurality of entries, each of the plurality of entries of the access control table corresponding to a respective one of the plurality of regions, at least some of the plurality of entries of the access control table including at least one entity identifier and one of a plurality of protection levels, only entities corresponding to one of the at least one entity identifier being permitted access to the respective one of the plurality of regions according to the one of the plurality of protection levels, wherein a respective range of each of the plurality of regions is based on logical block addresses.

17. The storage device of claim 14, further comprising:

an access control table having a plurality of entries, each of the plurality of entries of the access control table corresponding to a respective one of the plurality of regions, at least some of the plurality of entries of the access control table including at least one entity identifier and one of a plurality of protection levels, only entities corresponding to one of the at least one entity identifier being permitted access to the respective one of the plurality of regions according to the one of the plurality of protection levels, at least one of the plurality of entries of the access control table indicating that a respective region is not protected, access to the respective not-protected region being permitted to all entities.

18. The storage device of claim 14, further comprising:

an access control table having a plurality of entries, each of the plurality of entries of the access control table corresponding to a respective one of the plurality of regions, at least some of the plurality of entries of the access control table including at least one entity identifier and one of a plurality of protection levels, only entities corresponding to one of the at least one entity identifier being permitted access to the respective one of the plurality of regions according to the one of the plurality of protection levels, the plurality of protection levels including read/write protection without encryption, write protection without encryption, read/write protection with encryption, and read protection with encryption.

19. The storage device of claim 14, further comprising:

an access control table having a plurality of entries, each of the plurality of entries of the access control table corresponding to a respective one of the plurality of regions, at least some of the plurality of entries of the access control table including at least one entity identifier and one of a plurality of protection levels, only entities corresponding to one of the at least one entity identifier being permitted access to the respective one of the plurality of regions according to the one of the plurality of protection levels, the plurality of protection levels including read/write protection without encryption, write protection without encryption, read/write protection with encryption, and read protection with encryption, wherein a respective range of each of the plurality of regions is based on logical block addresses.

20. The storage device of claim 14, further comprising:

an authentication mechanism to authenticate an entity before permitting the entity to access a protected one of the plurality of regions, the entity being permitted access to the protected one of the plurality of regions only when the entity corresponds to one of at least one entity identifier being permitted access to the protected one of the plurality of regions and the entity is successfully authenticated by the authentication mechanism.

* * * * *